March 15, 1949.   E. E. LANDAHL   2,464,589
BRAKE COUPLING

Filed Sept. 4, 1945   3 Sheets-Sheet 1

Inventor
Eugene E. Landahl
By
Attorney

March 15, 1949.  E. E. LANDAHL  2,464,589
BRAKE COUPLING
Filed Sept. 4, 1945  3 Sheets-Sheet 2
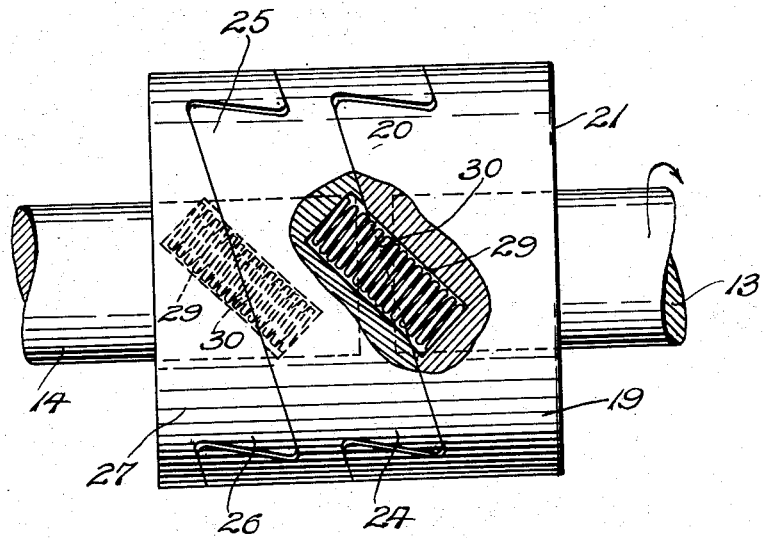
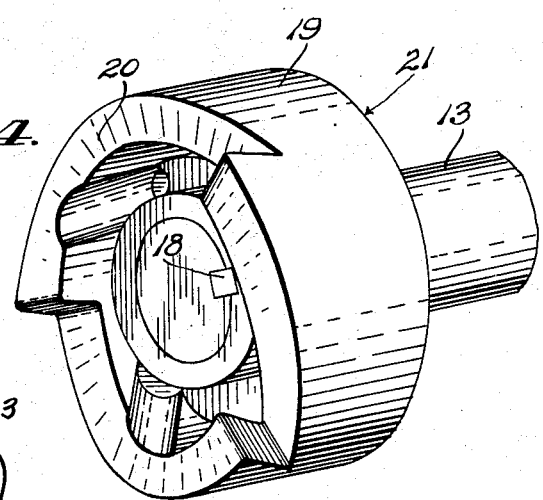
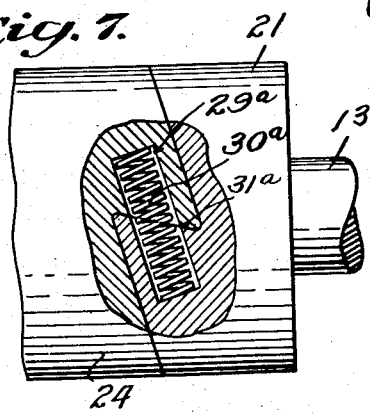
Inventor
Eugene E. Landahl
By N. A. McDowell
Attorney

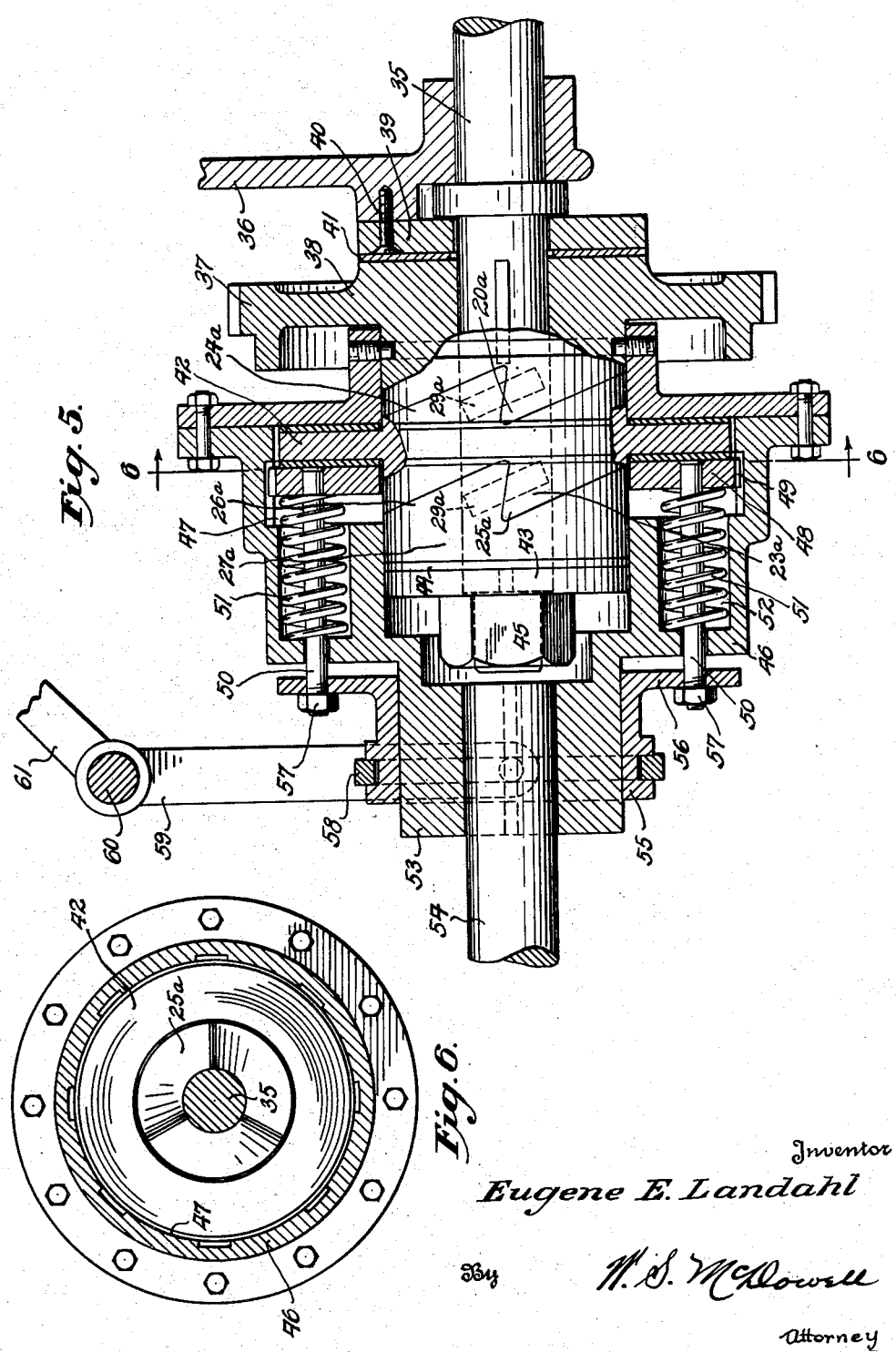

Patented Mar. 15, 1949

2,464,589

UNITED STATES PATENT OFFICE 2,464,589

BRAKE COUPLING

Eugene E. Landahl, Detroit, Mich.

Application September 4, 1945, Serial No. 614,219

5 Claims. (Cl. 192—8)

This invention relates to brake couplings of the type employed in transmitting power from a controlling member to a controlled member, such as drive and driven shafts, and wherein rotation of the controlled member is arrested when it responds to rotational forces produced by causes or means other than that imparted thereto by the controlling member.

It is an object of the present invention to provide a structurally simple and effective coupling for automatically holding the driven member thereof against rotation during periods of use in which the driving member is ineffective.

Another object of the invention is to provide a power-transmitting coupling of the character indicated wherein the driven or controlled member is restrained against motion which may tend to occur as a result of forces independent of its actuation by the driving or controlling member.

A further object of the invention is to provide a brake or stop coupling having a stationary housing formed with an internal clutch and brake chamber in which is rotatably mounted the co-axially disposed ends of a drive and a driven shaft, the said shafts being provided with longitudinally movable and rotatable clutch members having interengageable jaw teeth, said clutch members cooperating with said shafts and the ends of said housing chamber to provide automatic means for restraining the driven shaft, against torque-transmission to the drive shaft, in either direction of rotation of the driven shaft, under conditions when said drive shaft is inactive or idle.

In connection with the foregoing objects, I have developed certain novel structural details and part arrangements which may be more thoroughly understood by reference to the following description and the accompanying drawings, wherein:

Fig. 3 is a side elevational view of the jaw clutch members utilized in the coupling, portions thereof being broken away and disclosed in section to indicate underlying structure;

Fig. 4 is a perspective view of the jaw clutch member carried by the drive shaft of the coupling;

Fig. 5 is a vertical sectional view disclosing the coupling as adapted to a motor vehicle clutch mechanism;

Fig. 6 is a vertical transverse sectional view on the line 6—6 of Fig. 5;

Fig. 7 is an elevational view, with parts broken away and shown in section, illustrating a modified form of spring arrangement.

Figure 1:
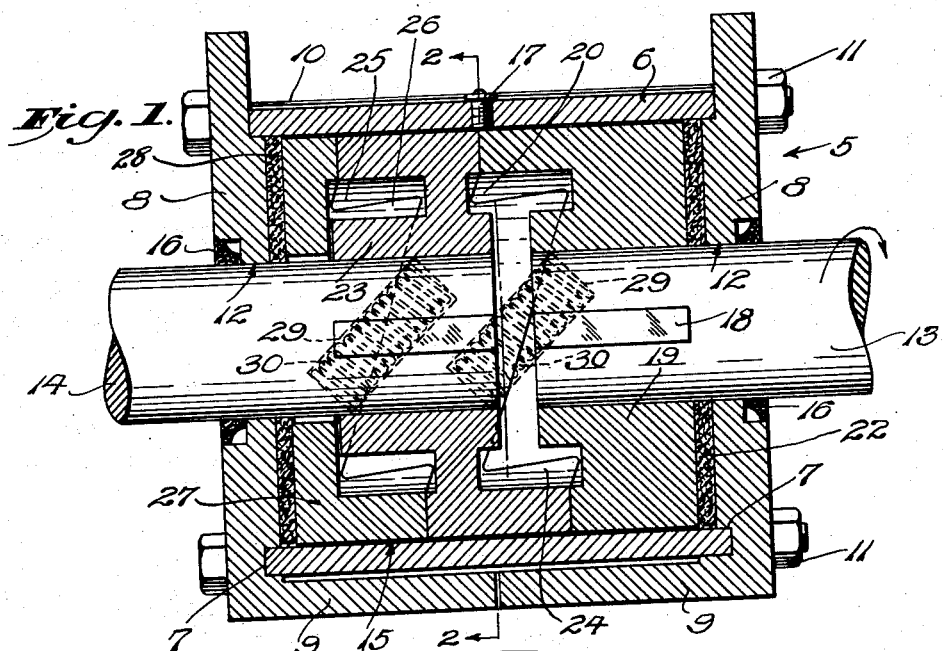
Fig. 1 is a vertical longitudinal sectional view taken through the improved brake coupling forming the present invention.

Referring more particularly to the drawings, the numeral 5 designates, in its entirety, the housing of my improved coupling. The housing may comprise, as shown, a cylinder 6 having its ends received in recesses 7 provided in spaced vertical end walls 8, the lower ends of said walls terminating in inwardly directed, horizontally disposed, base flanges 9, which are adapted to be bolted or otherwise secured to a stationary support. The walls 8 are also provided with aligned openings for the reception of circularly arranged, longitudinally extending tie bolts 10, the latter being headed at one end and having their opposite or threaded ends formed for the reception of clamping nuts 11, by which the parts of the housing are maintained in assembled order.

The walls 8 are formed with axially aligned openings 12 for the rotatable reception of a drive shaft 13, which constitutes the controlling or driving member of the coupling and a coaxially aligned driven shaft 14, forming the controlled or driven member of the coupling or transmission. The adjoining ends of the shaft members 13 and 14 project into the fluid-tight clutch or brake chamber 15 formed internally of the housing 5. The chamber 15 is adapted to receive an oil or other lubricant and is maintained fluid-tight by the use of oil seals 16 which surround the shafts where they project through the openings 12 in the housing walls 8. The cylinder 6 may be provided with a removable cap or plug 17 for the introduction of the lubricant into the chamber 15.

Slidably keyed, as at 18, on the end of the drive shaft within the chamber 15 is a first clutch member 19, the latter having its inner face formed with spiral jaw teeth 20 and its outer face 21 machined to provide a smooth plain surface arranged for cooperation with a loose disk 22 composed of brake-lining material, such as asbestos or the like.

Similarly keyed and slidably mounted on the adjoining end of the driven shaft 14 is a second complementary clutch member 23 which is disposed in the housing chamber 15 for cooperation with the first clutch member 19. The clutch member 23 has its opposite side faces formed with spiral jaw teeth, as indicated at 24 and 25, the teeth 24 being adapted for engagement with the teeth 20 of the first clutch member, while the teeth 25 are adapted for cooperation with correspondingly formed jaw teeth 26 formed on a third clutch member 27, the latter rotating freely about the longitudinal axis of the driven shaft 14. The outer side surface of the clutch member 27 is plain and smooth and adapted for engagement with a second brake disk 28, positioned in the end of the chamber 15 opposite to that occupied by the disk 22.

The clutch members 19, 23 and 27, adjacent to their interengaging toothed faces, are formed with angularly disposed sockets 29 adapted for the reception of coiled, expansion-type springs 30, the normal tendency of the latter being to effect relative turning movement between said clutch members tending to separate the interengaged relationship of their jaws or teeth.

Figure 2:
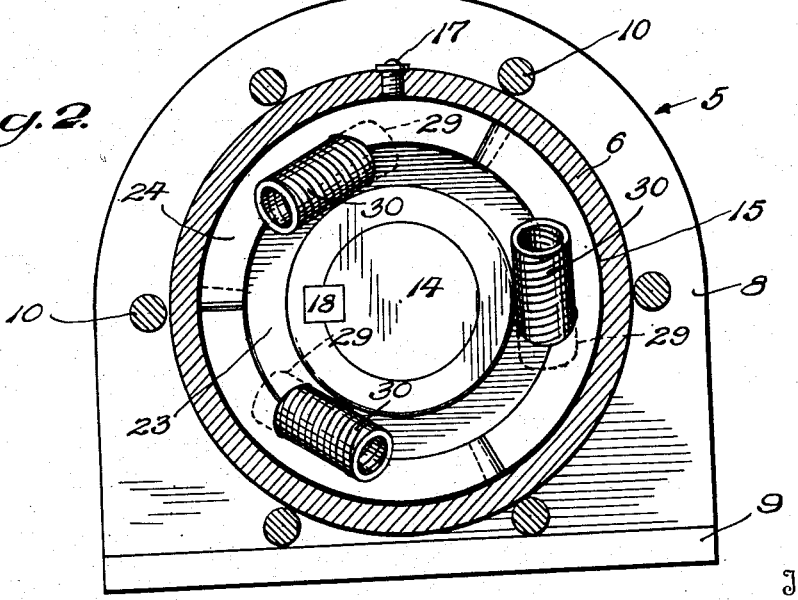
Fig. 2 is a vertical transverse sectional view taken through the coupling on the plane indicated by the line 2—2 of Fig. 1.

Preferably, three sets of the springs 30 are used for each complemental pair of clutch members, as shown in Fig. 2. These springs have a tendency to always separate the jaws of the clutch members rotationally and, due to the configuration of the spiral or cam-like faces of the clutch jaws, said springs serve to impart endwise movement to said clutch members to force the same, under certain conditions of active operation, into braking engagement with the disks 22 and 28, thus holding the load carried by the driven shaft and preventing rotation of the latter in either direction when power is not applied thereto by the drive shaft. When power to the driving shaft is shut off, and if the driven shaft continues to rotate, the spiral jaw teeth 24 of the clutch member 23 will engage those of the first clutch member 19 in a manner imparting outward longitudinal thrust motion to the clutch members 19 and 27, thereby bringing the latter clutch members into braking engagement with the disks 22 and 28, and arresting rotation of the driven shaft. If the resisting load on the driven shaft tends to rotate the latter in an opposite direction when the drive shaft is idle to that just described, the middle clutch member 23 binds on the loose or third clutch member 27, thrusting the latter into engagement with the brake disk 28, thus holding the load. The housing is bolted on an external support and carries the clutch members which preferably operate in a fluid lubricant. On normal starting, the jaw teeth are so shaped that each clutch member will pick up the other in such a manner that all end thrust binding is eliminated, and the coupling is free to turn and transmit power so long as it is being accomplished by the source of power provided by the drive shaft 13. Proper care should be used in designing the spiral faces of the jaw teeth on the clutch members so that the latter will not lock with the end thrust forces against the housing and so that there will not be any difficulty from binding during starting. Also, the shape of the teeth must be such that each will pick up the other and have a tendency to telescope or come together when there is an existing load on the driven shaft. Further, the springs are designed to provide the proper wedging action required for holding the driven shaft from rotating when the drive shaft is idle.

It is obvious that my improved coupling may be employed in many power-imparting drive mechanisms, where it is desired to lock a driven member against rotation when the drive member is idle or stationary. For example, as shown in Figs. 5 and 6, the coupling is embodied in the clutch mechanism of a motor vehicle, in which capacity it serves as an automatic parking or emergency brake, dispensing with the usual hand operated brake employed for that purpose on most motor vehicles.

In the latter figures, the numeral 35 designates the clutch end of an engine crank shaft, the latter being rotatable in a bearing provided in a crank case indicated at 36. Keyed for limited longitudinal sliding movement on the crank shaft is an engine-starting gear 37, the latter having a smooth faced hub 38 which is adapted for engagement with an end thrust plate 39 fastened to the crank case 36 as at 40, the thrust-receiving face of the plate 39 being provided with a lining material 41.

The hub 38 of the gear 37 on the opposite side of the latter with regard to the plate 39 is formed with spiral clutch jaws 20a, which correspond in construction and function to the jaws 20. The jaws 20a are adapted for engagement with correspondingly formed jaws 24a provided on one side of a clutch hub 23a, the latter in this instance being freely rotatable on the crank or drive shaft 35. The hub 23a has formed therewith a clutch plate 42 having the opposite faces thereof provided with lining material. The end of the hub 23a, opposite to the end provided with the jaws 24a, is formed with spiral clutch jaws 25a, which normally engage with correspondingly shaped jaws 26a provided on a third clutch member 27a loosely mounted on the crank shaft 35 for rotation thereabout in unison with the clutch hub or member 23a. The outer end of the member 27a is provided with a smooth face and is adapted for engagement with an end thrust plate 43 having its inner face lined with a braking material 44, the plate 43 being positioned on the outer end of the crank shaft 35 and held in position by a nut 45 threaded on the rear end of the crank shaft.

Rotatably supported on these elements is a clutch housing 46, having an internal chamber 47 in which the clutch plate 42 and associated elements are received. Positioned in the chamber 47 and slidably mounted on the hub 23a is a clutch ring 48 having its perimeter keyed as at 49 in the outer wall of the chamber 47. The ring 48 carries longitudinally extending parallel studs 50 which slidably project through openings provided in the outer wall of the housing 46. These studs are surrounded by coil springs 51 positioned in pockets 52 formed in the clutch housing. One end of each of these springs engages with the closed outer wall of its pocket and its other end engages with the clutch ring 48, normally maintaining the latter in frictional engagement with the clutch plate 42, so that as the latter rotates, corresponding motion is imparted to the clutch housing.

Rearwardly, the clutch housing terminates in a hub 53 with which is connected a transmission or driven shaft 54. Slidable on the hub 53 is a sleeve 55, having a flange 56 formed with openings for the reception of the outwardly projecting ends of the studs 50, said ends being equipped with nuts 57. The sleeve 55 is formed with an annular groove for the reception of a ring 58 and pivotally connected with this ring is a clutch-operating yoke 59. The upper end of the yoke is fixed to a rock shaft 60, which carries a foot-operated clutch pedal 61.

It will be seen that by depressing the pedal 61, sliding movement will be imparted to the sleeve 55 in a rearward direction, and since this sleeve is connected with the clutch ring 48 by means of the studs 50, the said ring will be withdrawn from driving engagement with the clutch plate 42. When the clutch pedal is released, the springs 51 restore the ring 48 to its normal engagement with the clutch plate, so that power from the crank shaft 35 may be transmitted to the clutch housing and its associated driven shaft 54.

The clutch members 38, 23a and 27a, adjacent to their interengaging toothed faces, are formed with angularly disposed sockets 29a adapted for the reception of coiled expansion-type springs, corresponding to the springs 30, the normal tendency of these springs being to effect relative turning movement between these clutch members tending to separate the interengaged relationship of their jaws or teeth. As long as the engine is running and the crank shaft 35 rotating, the jaws of the clutch members will transmit the rotational effort of the crank shaft through the housing 46 to the driven shaft 54. However, when operation of the engine is stopped, as when a motor vehicle is parked, the springs in the sockets 29a expand slightly and, due to the spiral formation of the clutch jaws, such expansion of the springs forces the forward end of the hub 38 into engagement with the brake-lined thrust plate 39, and the smooth rear face of the clutch member 27a into engagement with the brake-lined thrust plate 43, holding the driven shaft against rotation in either direction, thus locking the motor vehicle against longitudinal motion when the rotation of the crank shaft 35 is arrested.

In Fig. 7, the spring 30a is received in sockets 29a which open to the angular meeting faces 31a of the clutch jaws. This arrangement of the springs is considered preferable over that disclosed in Fig. 3 since the springs are not subjected to shear forces and their action is more positive.

Other adaptations or applications of my improved brake coupling will be apparent to those skilled in the art, as well as various structural alterations or modifications thereof. Therefore, I reserve the right to employ all such applications or structural modifications of my invention that may be said to fall fairly within the scope of the following claims.

I claim:

1. A coupling comprising driving and driven elements, outer and intermediate longitudinally movable and aligned clutch members, said members being formed with interengaging jaws having helical abutting faces and being rotatable about the longitudinal axis of said elements, said jaws acting to effect unitary rotation of said clutch members in unison with said driving element, spring means interposed between said clutch members and operative when said driving element is in a non-rotational state to produce relative rotation of said clutch members to cause the helical faces of the jaws thereof to effect limited longitudinal separation movement on the part of said members and frictional means operative to exert braking forces on said clutch members when said driving element is idle and the clutch members are responding to the influence of said spring means, whereby to restrain said driven element against rotation.

2. A coupling comprising longitudinally aligned driving and driven elements, outer and intermediate clutch members having interengaging jaws formed with helical abutting faces, means rotatably uniting one of the outer of said clutch members with said driving element and providing for limited longitudinal sliding movement of the same on said driving element, means for rotatably joining the intermediate clutch member with said driven element, spring means arranged between said outer and intermediate clutch members and operative when said driving element is stationary to effect relative rotation between said members in directions so that the helical faces of the jaws thereof produce limited longitudinal sliding movement of said outer clutch members in opposite directions, and means responsive to such outward movement of the outer clutch members to apply frictional braking forces thereto.

3. A coupling comprising a housing having a clutch chamber, separate longitudinally aligned driving and driven elements having their adjacent ends received within said housing, a first clutch member having helically faced jaw teeth on one side thereof and flat on its other, said member being rotatable with and slidable on said driving element, a second clutch member having helically faced jaw teeth on the opposite sides thereof, the teeth on one side of said second clutch member being engaged with the teeth of the first clutch member, a third clutch member having helically faced jaw teeth arranged for engagement with the second set of teeth on said second clutch member, and spring means interposed between said clutch members and operative when said driving element is in a non-rotational state to produce limited relative rotation between said clutch members in directions in which the helical faces of the jaw teeth thereof produce longitudinal separation movement between said members, and frictional means operative to exert braking forces on said clutch members when said driving element is idle and the clutch members are responding to the influence of said spring means to restrain said driven element against rotation.

4. A coupling as specified in claim 3 and wherein the helical faces of the jaws of said clutch members are formed with registering tangentially disposed pockets for the reception of said spring means.

5. A coupling comprising longitudinally aligned driving and driven elements, longitudinally movable and aligned clutch members having interengaging helically faced jaws rotatable about the longitudinal axis of said elements, means uniting one of the outer clutch members for rotation with said driving element and limited longitudinal sliding movement thereon, a clutch plate rotatable with said intermediate clutch member, a clutch housing having an internal chamber rotatable with said driven element, a longitudinally movable spring pressed clutch ring rotatable with said housing and normally engaged with said plate, manually operated means for moving said ring out of driving engagement with said clutch plate, the shaft of the jaws of said clutch members being such as to effect unitary rotation of said members when said driving element is rotated in one direction, spring means disposed between said clutch members and operative when said driving element is in a non-rotational state to provide relative rotation of said members in directions in which the helical faces of the jaws thereof cause limited longitudinal separation movement of said clutch members, and frictional means operative to exert braking forces on said clutch members when said driving element is idle and the clutch members are responding to the influence of said last-named spring means, whereby to restrain said driven element against rotation.

EUGENE E. LANDAHL.

REFERENCES CITED

The following references are of record in the file of this patent:

UNITED STATES PATENTS

| Number    | Name        | Date          |
|-----------|-------------|---------------|
| 1,532,877 | Buck        | Apr. 7, 1925  |
| 1,764,937 | Bonal et al.| June 17, 1930 |
| 1,821,838 | Juergens    | Sept. 1, 1931 |
| 2,075,567 | Benedek     | Mar. 30, 1937 |
| 2,372,693 | Swift       | Apr. 3, 1945  |